United States Patent [19]

Boufarah et al.

[11] Patent Number: 5,127,091
[45] Date of Patent: Jun. 30, 1992

[54] SYSTEM FOR REDUCING DELAY IN INSTRUCTION EXECUTION BY EXECUTING BRANCH INSTRUCTIONS IN SEPARATE PROCESSOR WHILE DISPATCHING SUBSEQUENT INSTRUCTIONS TO PRIMARY PROCESSOR

[75] Inventors: Edmond J. Boufarah, Austin; Gregory F. Grohoski, Cedar Park; Chien-Chyun Lee; Charles R. Moore, both of Ausin, all of Tex.

[73] Assignee: International Business Machines Corporation, Armonk, N.Y.

[21] Appl. No.: 297,784

[22] Filed: Jan. 13, 1989

[51] Int. Cl.⁵ .............................................. G06F 9/38
[52] U.S. Cl. .................................. 395/375; 364/230.6; 364/231.8; 364/261.5; 364/263; 364/263.1; 364/271.2; 364/931.5; 364/938.1; 364/938.2; 364/948; 364/948.3; 364/DIG. 1; 395/800
[58] Field of Search ... 364/200 MS File, 900 MS File; 395/375

[56] References Cited

U.S. PATENT DOCUMENTS

| | | | |
|---|---|---|---|
| 3,699,526 | 10/1972 | Iskiyan et al. | 340/172.5 |
| 4,210,960 | 7/1980 | Borgeson et al. | 364/200 |
| 4,373,180 | 2/1983 | Linde | 364/200 |
| 4,390,946 | 6/1983 | Lane | 364/200 |
| 4,551,798 | 11/1985 | Horvath | 364/200 |
| 4,679,141 | 7/1987 | Pomerene et al. | 364/200 |
| 4,742,451 | 5/1988 | Bruckert et al. | 364/200 |
| 4,742,453 | 5/1988 | Shibuya | 364/200 |
| 4,777,594 | 10/1988 | Jones | 364/200 |
| 4,791,557 | 12/1988 | Angel et al. | 364/200 |
| 4,853,840 | 8/1989 | Shibuya | 364/200 |
| 4,853,889 | 8/1989 | Ditzel et al. | 364/900 |
| 4,912,635 | 3/1990 | Nishimukai et al. | 364/200 |
| 4,974,154 | 11/1990 | Matsuo | 364/200 |
| 4,991,078 | 2/1991 | Wilheim et al. | 364/200 |
| 4,991,080 | 2/1991 | Emma et al. | 364/200 |
| 4,992,932 | 2/1991 | Ohshima | 364/200 |

OTHER PUBLICATIONS

*IBM Technical Disclosure Bulletin*, vol. 29, No. 1, Jun., 1986, entitled "Branch-Processing Instruction Cache", pp. 357-359.

*Primary Examiner*—Thomas C. Lee
*Assistant Examiner*—Ken S. Kim
*Attorney, Agent, or Firm*—Thomas E. Tyson

[57] ABSTRACT

A data processing system including a circuit for storing a sequence of instructions, a circuit for determining if the instruction sequence includes a branch instruction, a circuit for storing a sequence of branch target instructions in response to the determination of the existence of a branch instruction in the stored sequence of instructions, a circuit for dispatching instructions in sequence after the branch instruction to a processor to be executed on condition that a branch is to be taken before a determination of whether said branch will be taken and simultaneously for determining if the branch is to be taken, any circuit for directing the processor to execute the instructions in sequence after the branch if the branch is not taken, or, if the branch is to be taken, for dispatching the branch target instruction sequence to the processor for execution.

32 Claims, 8 Drawing Sheets

```
C     ; FIXED PT COMPARE

BRC   ; COND. BR DEPENDENT UPON C
S1    ; SEQUENTIAL FIXED POINT INSTRUCTIONS
S2
S3
  .
  .
T1    ; TARGET INSTRUCTIONS
T2
T3
```

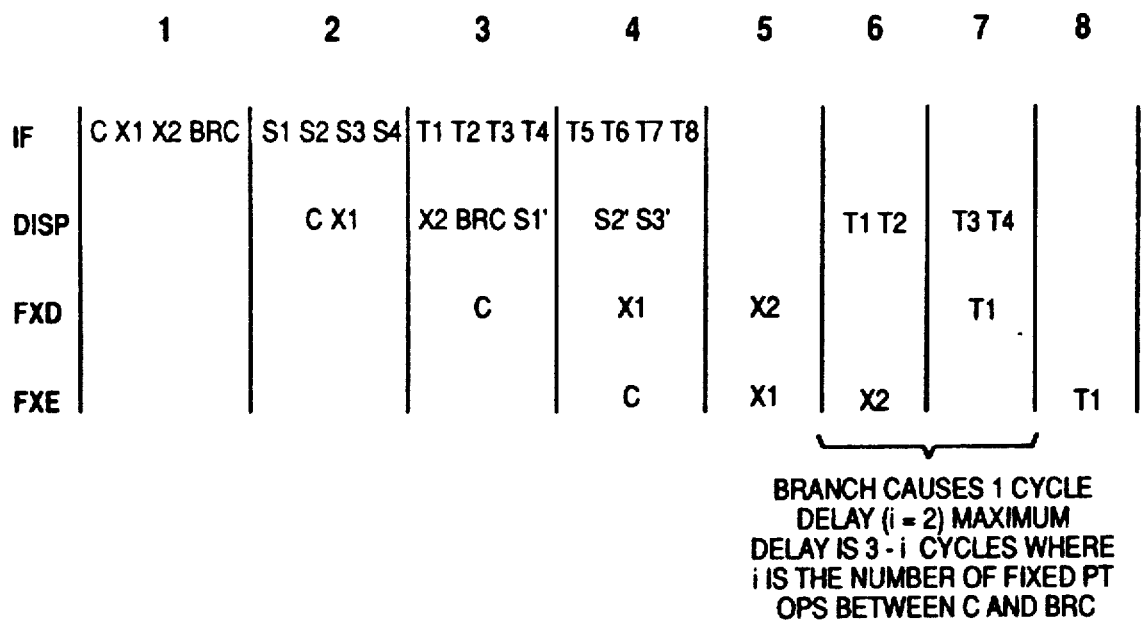

```
C       ; FIXED POINT COMPARE
X1
X2
X3
BRC     ; COND. BR DEPENDENT UPON C
S1      ; SEQUENTIAL FIXED POINT INSTRUCTIONS
S2
S3
.
.
T1      ; TARGET INSTRUCTIONS
T2
T3
T4
```

| | 1 | 2 | 3 | 4 | 5 | 6 | 7 | 8 |
|---|---|---|---|---|---|---|---|---|
| IF | C X1 X2 X3 | BRC S1 S2 S3 | | T1 T2 T3 T4 | T5 T6 T7 T8 | | | |
| DISP | | C X1 | X2 X3 BRC | S1' S2' | | T1 T2 | T3 T4 | |
| FXD | | | C | X1 | X2 | X3 | T1 | T2 |
| FXE | | | | C | X1 | X2 | X3 | T1 |

BRANCH CAUSES 0 CYCLE DELAY (i = 3) MAXIMUM DELAY IS 3 - i CYCLES WHERE i IS THE NUMBER OF FIXED PT OPS BETWEEN C AND BRC

SYSTEM FOR REDUCING DELAY IN INSTRUCTION EXECUTION BY EXECUTING BRANCH INSTRUCTIONS IN SEPARATE PROCESSOR WHILE DISPATCHING SUBSEQUENT INSTRUCTIONS TO PRIMARY PROCESSOR

DESCRIPTION

1. Related Applications

This patent application is related U.S. Pat. application. Ser. No. 07/126,818, entitled "Parallel Processor Instruction Dispatch Apparatus With Interrupt Handler", now abandoned and U.S. Pat. application, Ser. No. 07/135,170, entitled "Dynamic Buffer Control", now U.S. Pat. No. 4,916,658.

2. Technical Field

This invention relates to data processing systems and more specifically to a data processing system executing branch instructions.

3. Background Art

An obstacle to the fast execution of instructions in a data processing system is the execution of a branch instruction. Traditional processors execute instructions in a serial fashion, i.e., one instruction at a time. Therefore, instructions are executed sequentially in a normal mode. However, when a branch instruction is encountered, the instruction sequence may be varied, i.e., the instruction following the branch instruction may not be the new instruction executed. In traditional data processing systems, the execution of instructions is delayed until a branch instruction execution can be completed. This is because the result of the branch instruction execution must be known in order to determine which instruction is to be executed next. In data processing systems executing conditional branch instructions, a pre-existing condition must be determined before it will be known whether or not a branch may be taken as a result of a conditional branch instruction execution. As a result, the execution of a conditional branch instruction is delayed until the specified condition for the branch has been determined. In traditional processors the requirement for the resolution of conditions to perform branches has not been as much a problem as in more modern processing systems. In a pipeline processing system where an instruction is being fetched, dispatched, decoded and executed at different cycle times, the execution of branch instructions will result in delays since the execution phase must be completed for a conditional branch before the data processing system knows which instructions to fetch for execution after the branch.

The use of multiple processors in a data processing system increases the conditional branch execution problem even more since it is advantageous to distribute instructions in parallel to the multiple processors for execution. However, if the multiple processor system is to emulate the execution of instructions in a serial fashion, the execution of instructions after the occurrence of a branch instruction must be delayed until the branch instruction execution is completed.

An example of a prior art instruction dispatching apparatus for a multiple processing system is disclosed in the IBM *Technical Disclosure Bulletin*, Vol. 29, No. 1, Jun., 1986, entitled "Branch-Processing Instruction Cache", pages 357-359. This disclosure illustrates a mechanism for fetching instructions and includes the capability to process branch instructions while other instructions are being fetched.

It is an object of the present invention to provide a mechanism for executing branch instructions in a more efficient manner.

SUMMARY OF THE INVENTION

In accordance with the present invention a data processing system is provided that includes a circuit for storing a sequence of instructions, a circuit for determining if said instruction sequence includes a branch instruction, a circuit responsive to the determination of whether or not there is a branch instruction for storing a sequence of branch target instructions in the storing circuit. A circuit for dispatching instructions in sequence after the branch instruction to a processor. This sequence of instruction is to be executed on condition that the branch is not taken. This dispatch of the sequence of instructions is before a determination of whether the branch will be taken and simultaneous with the determination that the branch is to be taken. Also included is a circuit for directing, if the branch is not to be taken, the processor to execute the instructions in sequence after the branch instruction or, if the branch is to be taken, for dispatching the branch target instruction sequence to the processor for execution.

In the preferred embodiment the invention includes the data processing system having a memory, an instruction fetching and branch processing unit, and a fixed point processing unit. In the instruction fetching and branch processing unit, a mechanism is provided for fetching multiple instructions at a time and for storing these instructions in buffers. In this embodiment one buffer is provided for sequential instructions and a second buffer is provided for target instructions. Sequential instructions include the normal sequence of instructions that are being fetched and also instructions that are present after a branch instruction is encountered. Target instructions are instructions that are to be branched to if a branch is taken as a result of a branch instruction execution. In the preferred embodiment the instruction fetching and branch processing unit executes branch instructions while coordinating the dispatching of instructions to the fixed point processing unit. According to the teachings of this invention, in certain circumstances, branch instructions can be generated in a pipeline fashion without causing any pipeline cycle delays of instruction execution.

BRIEF DESCRIPTION OF THE DRAWING

The novel features believed characteristic of the invention are set forth in the appended claims. The invention itself, however, as well as other features and advantages thereof will be best understood by reference to the detailed description which follows, read in conjunction with the accompanying figures, wherein:

FIG. 2b is a timing diagram illustrating the pipelined instruction flow for the instruction sequence in FIG. 2a;

BEST MODE FOR CARRYING OUT THE INVENTION

This invention relates to the field of data processing and a provides a capability to execute branch instructions in a small amount of time. The objective of the invention is to execute a branch in zero cycles of a fixed point processor.

Figure 1:
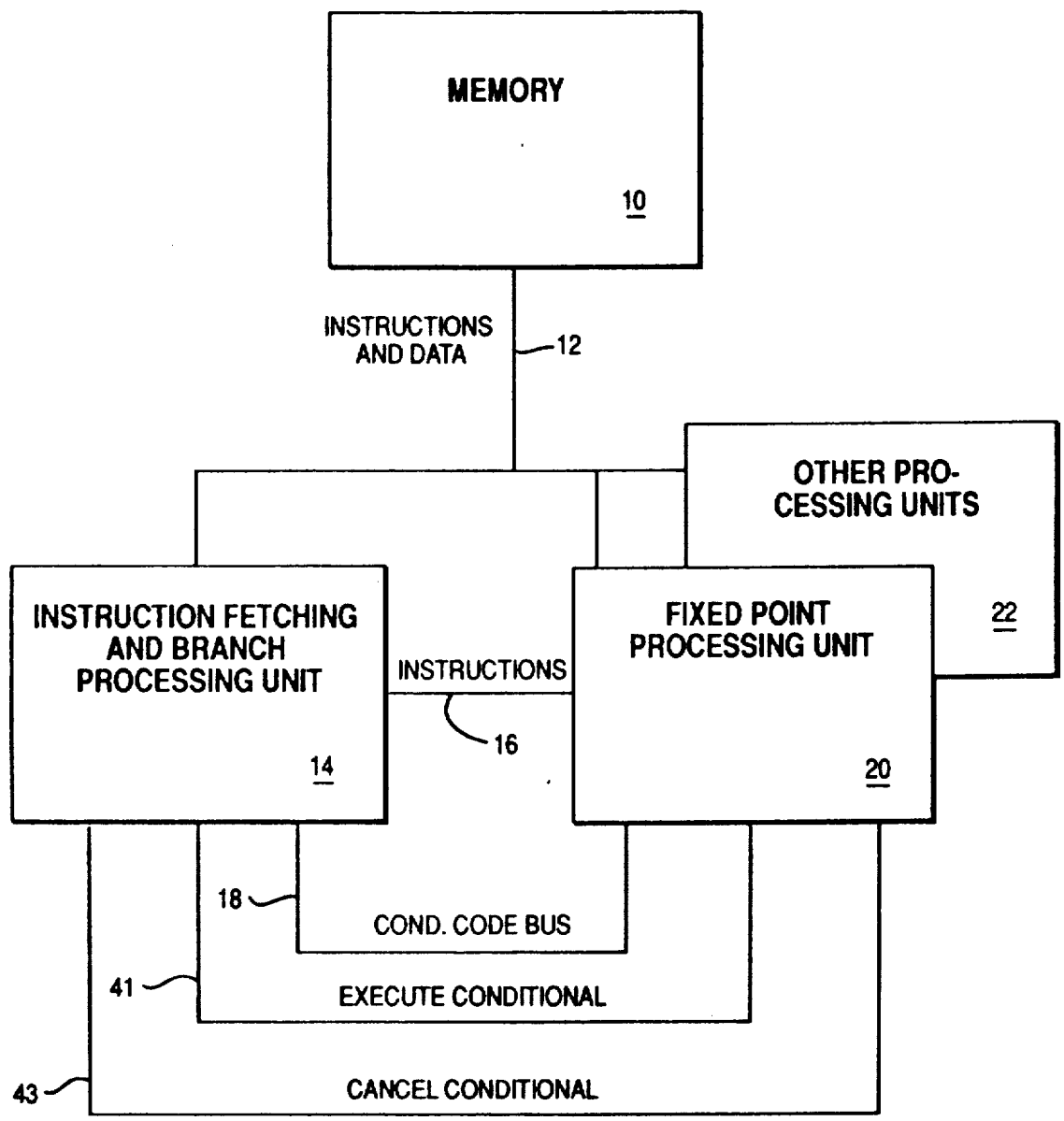
FIG. 1 is a block diagram of the data processing system.

FIG. 1 is a block diagram illustrating the processor system of the invention. In FIG. 1, memory 10 is connected by bus 12 to an instruction fetching and branch processing unit 14, a fixed point processing unit 20 and other processing units represented by block 22. The function of bus 12 is to provide a transfer of instructions and data from memory 10. The instruction fetching and branch processing unit 14 provides instructions over line 16 to the fixed point processing unit 20. Also conditional code information is provided to the instruction fetching and branch processing unit 14 over line 18 by the fixed point processing unit 20. In response to the condition code information or bus 18 provided the fixed point unit 20 to the instruction fetching unit 14, branch execution logic in the instruction fetching unit 14 generates the execute conditional signal via line 41 if the branch is not to be taken or generates the cancel conditional signal via line 43 if the branch is to be taken.

Figures 2A, 2B:
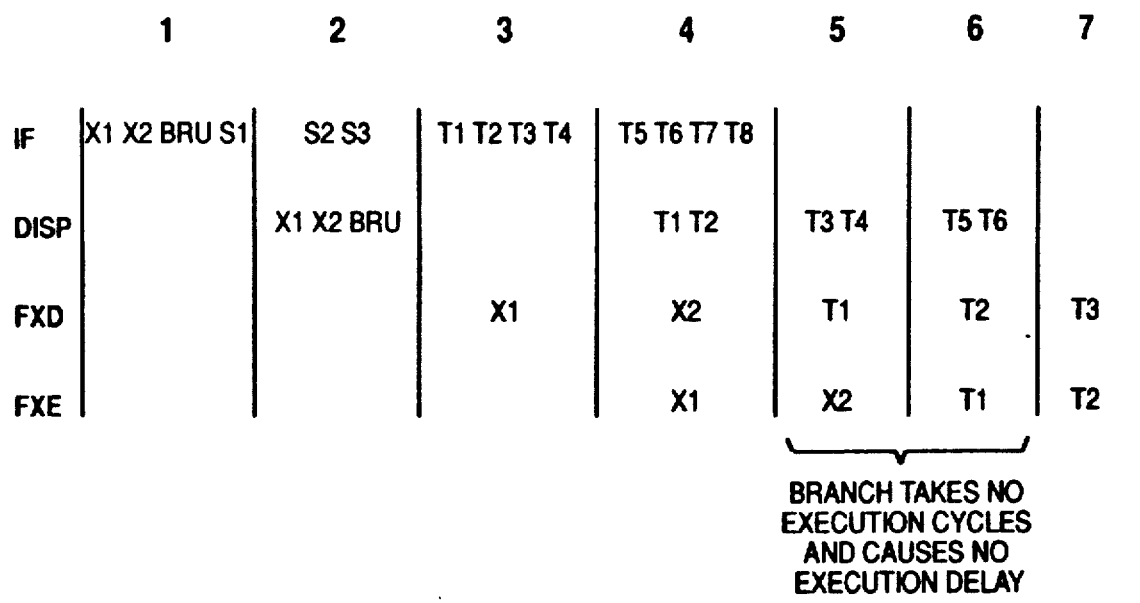

FIGS. 2a to 2j represent example instruction sequences and resulting timing diagrams for the execution of those sequences. In FIG. 2a an instruction sequence is provided that includes an unconditional branch instruction. Specifically the unconditional branch instruction (BRU) branches to instruction T1 (the target instruction). The timing diagram illustrating the operation of the invention with this instruction sequence is illustrated in FIG. 2b. In FIG. 2b four phases of the pipeline operation are illustrated. The first phase is the instruction fetch operation (IF). The second phase is the instruction dispatch operation (Disp). During the second phase the instruction fetching and processing unit 14 detects branch instructions and initiates branch instruction execution. The third phase is the fixed point processor decoding operation (FXD). The fourth is the fixed point processor execution of the instruction (FXE). In cycle 1, four instructions are fetched from the cache 34 (FIG. 3) which include X1, X2, BRU and S. Note that S designates the sequential instructions that occur after the unconditional branch instruction (BRU). In cycle 2 the instruction fetch operation fetches additional sequential instructions (S2 and S3). At the same time during cycle 2, the dispatch operation dispatches instructions X1 and X2 to the fixed point processing unit 20. The BRU instruction is dispatched and executed internally in the branch processing unit 14. The target address is generated in cycle 2. In cycle 3, as a result of the execution of the unconditional branch in the branch processing unit 14, the four target instructions are fetched, T1, T2, T3, T4. Also in cycle 3, instruction X1 is decoded in the fixed point processing unit 20. In cycle 4 an additional four target instructions are fetched (T5, T6, T7 and T8). Also in cycle 4 instructions T1 and T2 are dispatched to the fixed point processing unit 20. Meanwhile in cycle 4 the fixed point processing unit 20 decodes the instruction X2 and executes instruction X1. In cycle 5, the target instructions T3 and T4 are dispatched to the fixed point processing unit 20 while the fixed point processing unit 20 decodes instruction T1 and executes instruction X2. In cycle 6, instructions T5 and T6 are dispatched while the fixed processing unit 20 decodes target instruction T2 and executes instruction T1. Finally in cycle 7, the instruction T3 is being decoded while instruction T2 is being executed in the fixed point processing unit 20. Note that the branch operation takes no execution cycles and causes no execution delay since the fetching of the target instructions was accomplished as a result of the early execution of the branch instruction during the dispatch cycle 2.

Figures 2C, 2D:
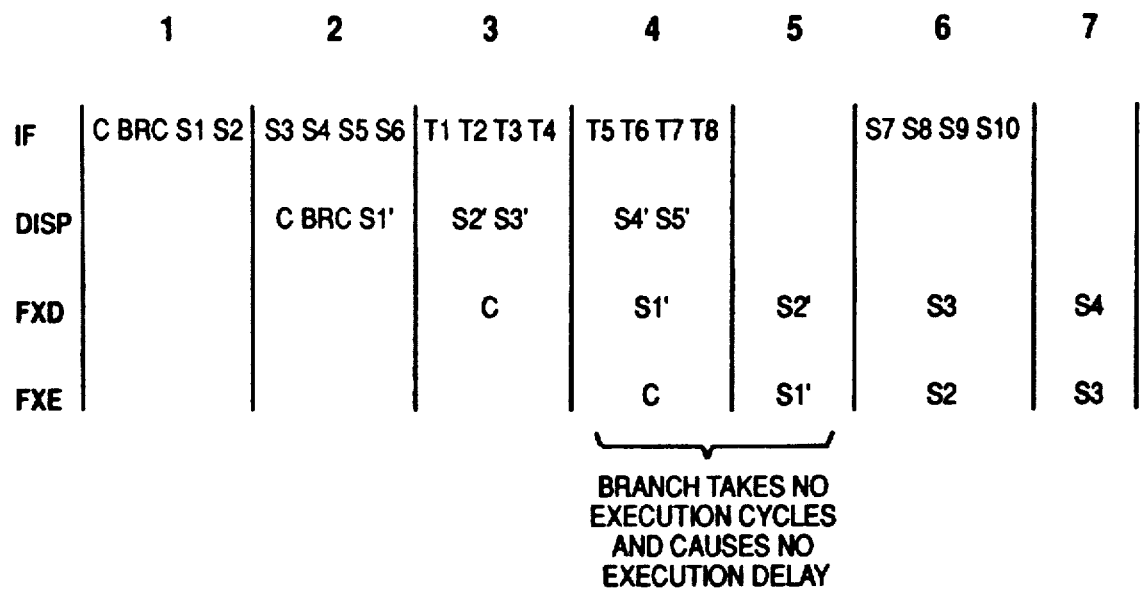
FIG. 2c is an instruction sequence including a not taken conditional compare adjacent to a compare instruction.
FIG. 2d is a timing diagram illustrating the pipelined data flow of the instruction sequence in FIG. 2c.

In FIG. 2c an instruction sequence is included that provides for a fixed point compare instruction (C) followed by a branch on condition instruction (BRC). If the branch is not taken, the sequential instructions following the branch will be executed (S1, S2, and S3). However, if the branch is taken the target instructions are executed (T1, T2, and T3). In the following example the conditional branch is not taken. The timing diagram in FIG. 2d illustrates the operation of the processing unit. Initially in cycle 1 four instructions are fetched including the condition instruction (C), the conditional branch instruction (BRC), and the two sequential instructions S1 and S2. In cycle 2 the next four sequential instructions (S3 through S6) are fetched while the compare instruction C and the sequential instruction S1 are passed to the fixed point processing unit 20. The S1' indicates that instruction S1 is passed as an instruction for conditional execution. In other words, the execution of S1 is conditional on the event that the branch is not taken. The conditional branch instruction (BRC) is passed to the branch processing unit 14 where it is executed. However, the completion of the execution of the conditional branch is delayed until the compare instruction is executed in the fixed point processing unit 20. In cycle 3, because of the initial execution of the branch instruction, four of the target instructions are fetched (T1 through T4). Simultaneously instructions S2 and S3 are dispatched to the fixed point processing unit 20. Note that these instructions are dispatched as conditional instructions that will be executed upon the condition that the conditional branch will not be taken. In the fixed processing unit during cycle 3, the fixed point processor decodes the compare instruction. In cycle 4 the next four target instructions are fetched (T5 through T8). Also the next two sequential instructions S4 and S5 are dispatched as conditional instructions to the fixed point processing unit 20. The fixed point processing unit 20 decodes the sequential instruction S1 while it executes the compare instruction. At the completion of the execution of the compare instruction the result of the compare instruction is provided to the branch processing unit 14 indicating to the branch processing unit 14 that the branch will not be taken (i.e., that the sequential instructions should be executed). The execute condition is asserted via line 41. Next in cycle 5 the fixed point processing unit 20 decodes the sequential instruction S2 while it executes the sequential instruction S1. Also in cycle 5 the fetching of target instructions is suspended and the dispatching of target instructions is suspended. In cycle 6 the fetching of sequential instructions is resumed with the fetching of sequential instructions S7 through S10. Also in cycle 6, the fixed point processing unit 20 decodes instruction S3 and executes sequential instruction S2. Finally in cycle 7, the fixed point processing unit is decoding instruction S4 and is executing instruction S3 illustrating that the sequential instruction sequence is being executed. Note that again the execution of the branch takes no execution cycles and causes no delay even though the branch was not taken.

Figure 2E:
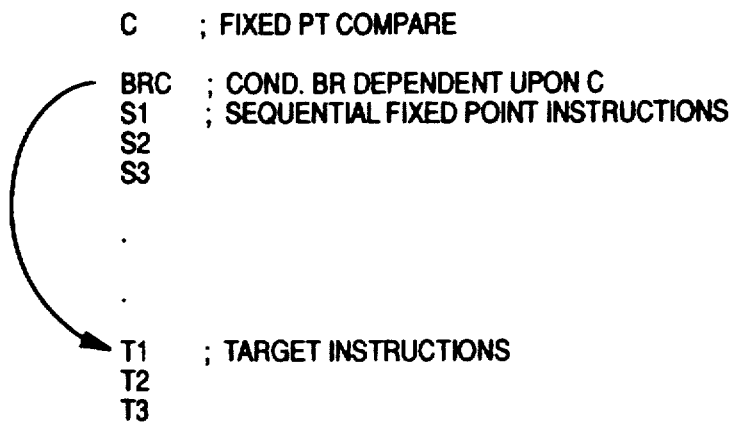
FIG. 2e is an instruction sequence including a taken conditional branch instruction adjacent to a compare instruction.

FIG. 2e illustrates a conditional branch instruction where the branch is taken. The sequence illustrated in FIG 2e includes a fixed point compare instruction C, a conditional branch instruction BRC followed by a set of sequential instructions S1 through S3 then followed by a sequence of target instructions T1 through T4. The execution of this sequence is illustrated in FIG. 2f.

Figure 2F:
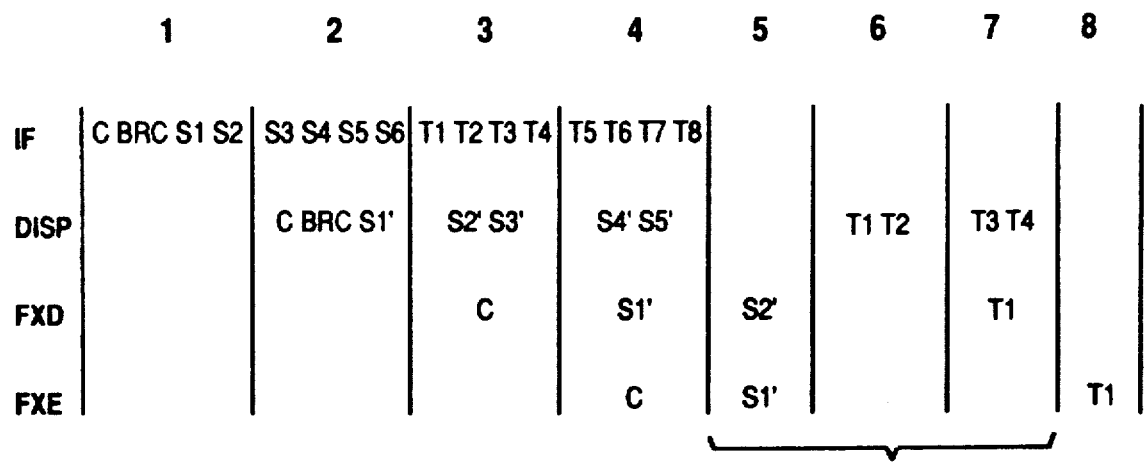
FIG. 2f is a timing diagram illustrating the pipelined instruction flow for the instruction sequence of FIG. 2e.

In FIG. 2f in cycle 1 the four instructions are fetched (C, BRC, S1, and S2). In cycle 2, the next four instructions are fetched (S3 through S6) and the compare instruction and the first sequential instruction (S1) are dispatched to the fixed point processing unit 20 while the conditional branch instruction BRC is initially executed in the branch processing unit 14. In cycle 3 four of the target instructions are fetched (T1 through T4). The sequential instructions S2 and S3 are conditionally dispatched to the fixed point processing unit 20. Meanwhile, the compare instruction is decoded in the fixed point processing unit 20. In cycle 4 the next four target instructions are fetched (T5 through T8), while the sequential instructions S4 and S5 are conditionally dispatched to the fixed point processing unit 20. The sequential instruction S1 is being decoded in the fixed processing unit at the same time the compare instruction is being executed. As a result of the completion of the execution of the compare instruction in cycle 4, the branch processing unit 14 is informed that the branch should be taken. Therefore, in cycle 5 the sequential instruction S1 whose execution is conditioned on the branch not being taken will not be executed as a result the assertion of the cancel conditional line 43. Also even though the sequential instruction S2 is being decoded it will be purged. In cycle 6 the first two target instructions T1 and T2 are dispatched to the fixed point processing unit 20. In cycle 7 instruction T1 is being decoded and executed in cycle T8. Note that the execution of this conditional branch results in a three cycle delay. This is a worse case condition since the maximum delay in this configuration is 3-i cycles where i is the number of fixed point operations that are located between the compare and branch on compare instructions.

Figures 2I, 2J:
FIG. 2i is an instruction sequence including a compare instruction with three intermediate instructions adjacent to a conditional branch instruction.
FIG. 2j is a timing diagram illustrating the pipeline instruction flow for the instruction sequence in FIG. 2i.
Figure 2A:
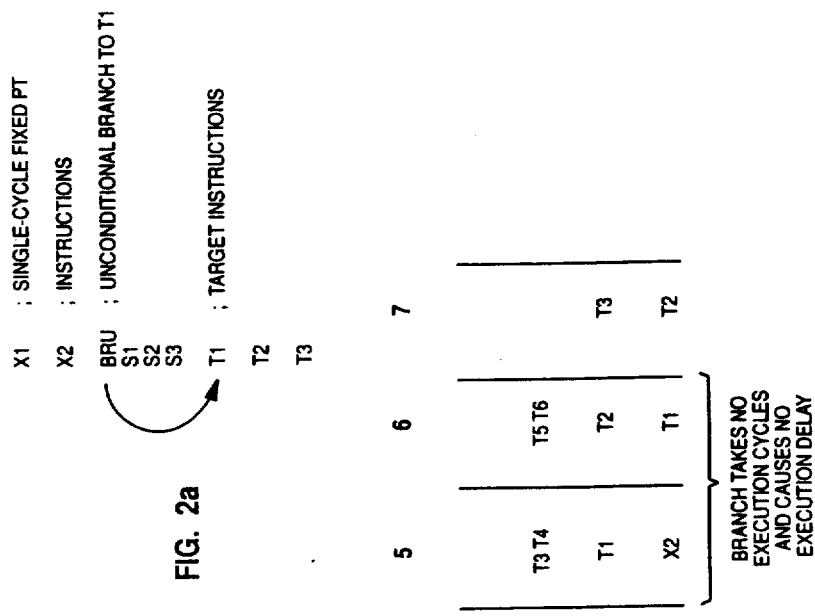
FIG. 2a is an instruction sequence containing an unconditional branch.
Figure 2B:
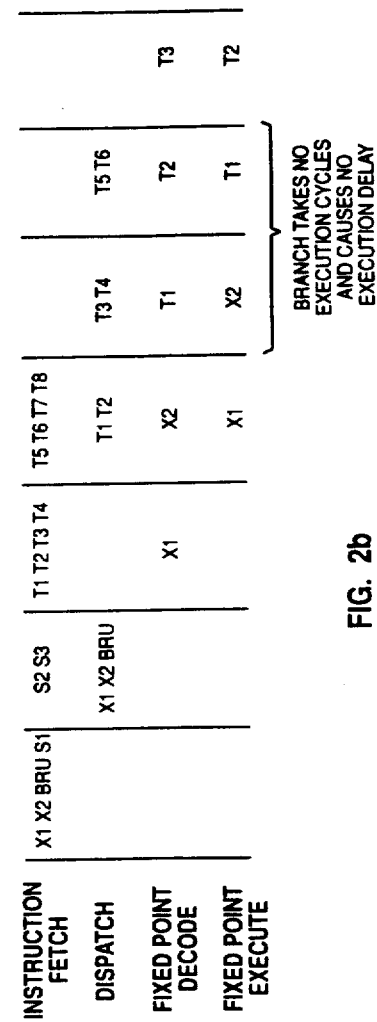
Figure 2E:
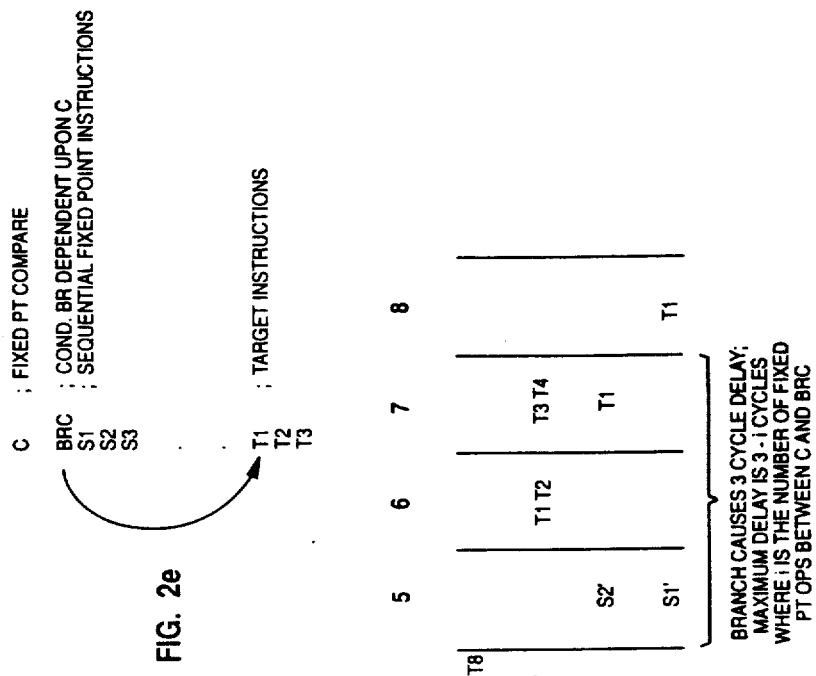
Figure 2F:
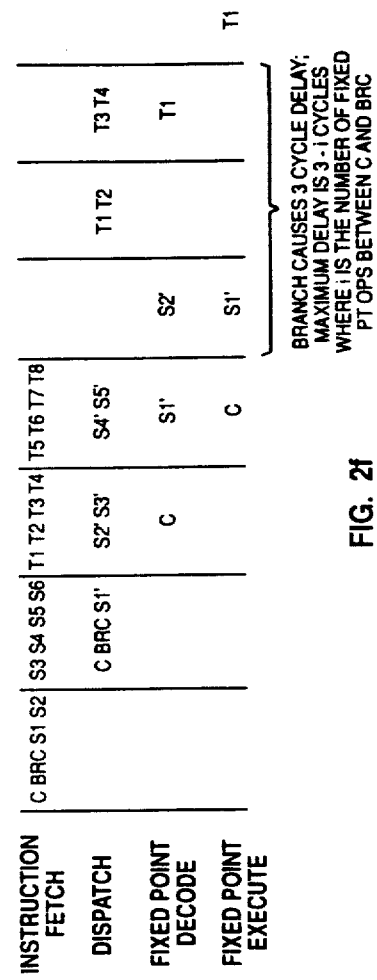
Figure 2G:
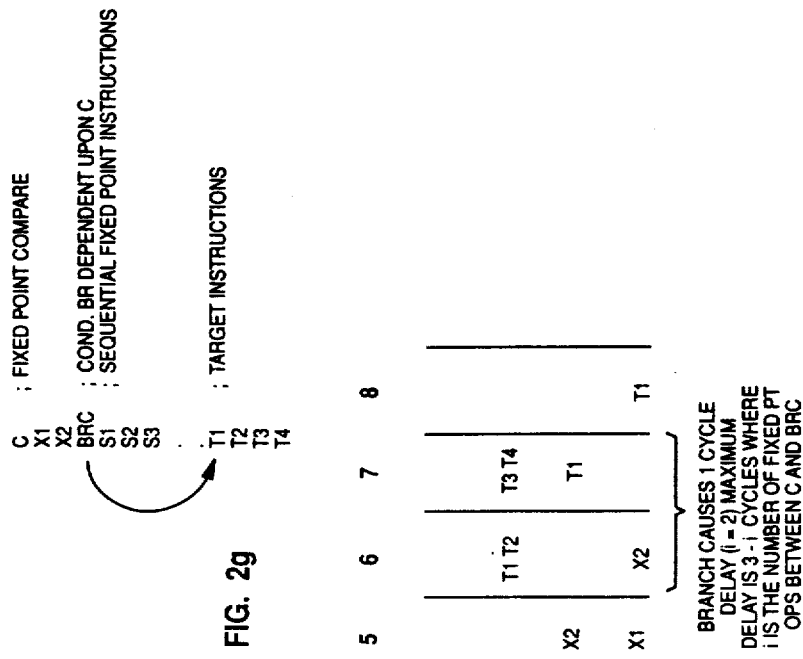
FIG. 2g is an instruction sequence including a compare instruction with instructions between the compare and the taken conditional branch instruction.
Figure 2H:
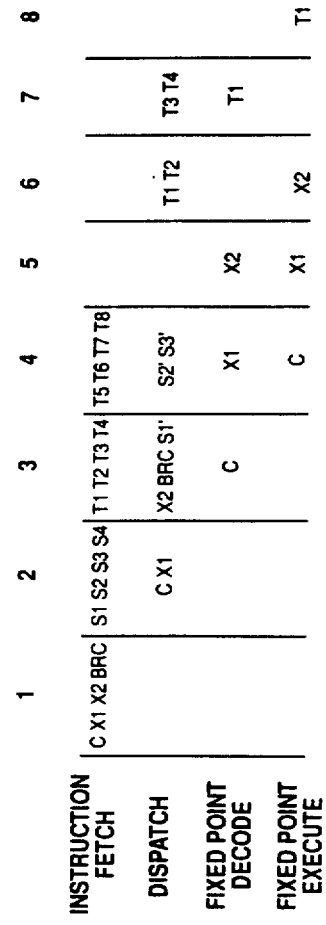
FIG. 2h is a timing diagram illustrating the pipelined instruction flow for the instruction sequence in FIG. 2g.
Figure 2I:
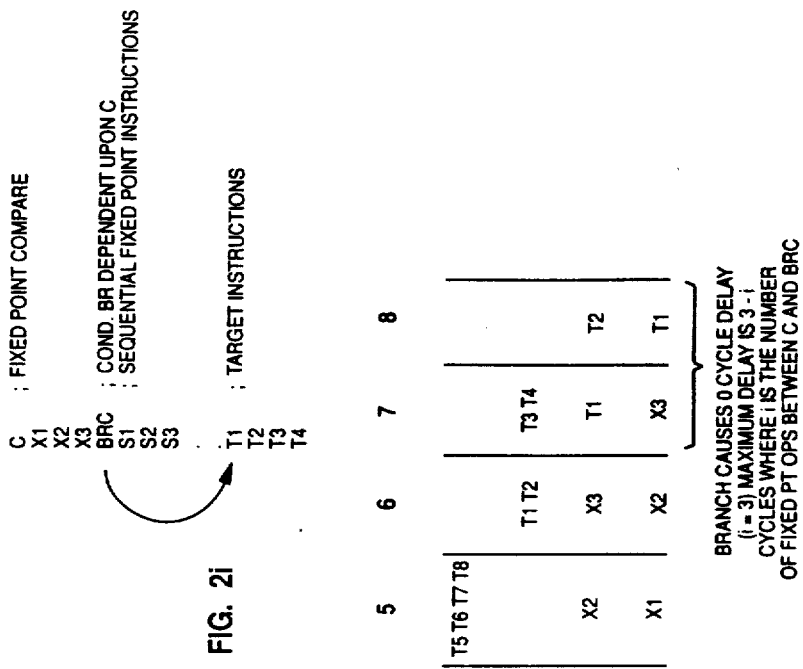
Figure 2J:
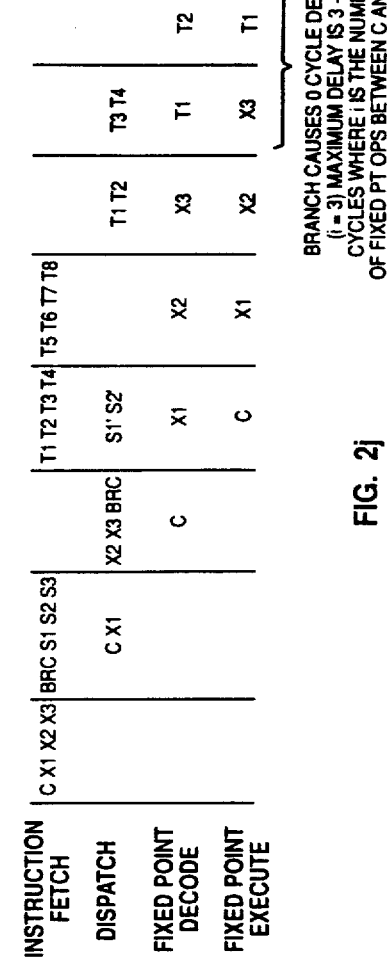
Figure 3:
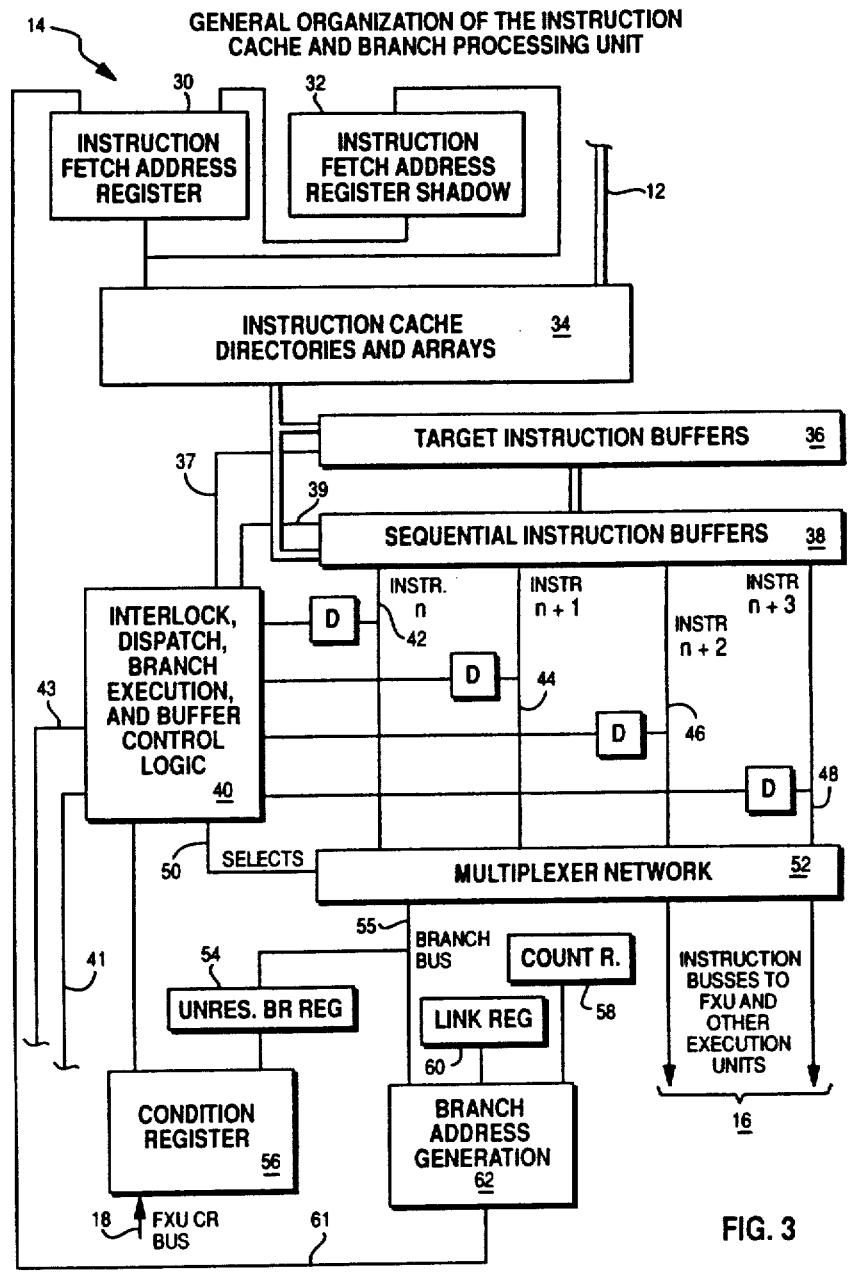

In FIG. 2g another instruction sequence is illustrated that first includes a compare instruction followed by two fixed point instructions X1 and X2. Following X2 is a branch on condition of the compare instruction. Following the branch is the set of sequential instructions S1 and S3 followed later by the target instructions T1 through T4. The timing execution of these instruction sequences are illustrated in FIG. 2h. Referring to FIG. 2h, in cycle 1, the first four instructions are fetched (C, X1, X2 and BRC) In cycle 2 the next four instructions in the sequence are fetched (S1 through S4) while the compare instruction and the first fixed point instruction X1 are dispatched to the fixed point unit 20. Also during cycle 2, the instruction sequence that has been fetched has been scanned for branch instructions. Upon encountering a branch instruction, the scanning logic determines if the target instructions of the branch can be computed. In the example given the target instruction addresses are computed and then in cycle 3 the first four target instructions T1 through T4 are fetched. Also during cycle 3 instruction X2 is unconditionally dispatched and sequential instruction S1 is conditionally are dispatched to the fixed point processing unit 20. The conditional branch instruction BRC is dispatched to the processing unit 14. The fixed point processing unit 20 decodes the compare instruction C. In cycle 4, the next four target instructions are fetched (T5 through T8) while sequential instructions S2 and S3 are dispatched to fixed point processing unit. The fixed point processing unit 20 decodes instruction X1 and executes the compare C. As a result of the compare instruction the branch is taken. In cycle 5 instruction X2 is decoded by the fixed point processing unit 20 while the instruction X1 is executed. However, no additional instructions are fetched during these cycles and no instructions are dispatched. In cycle 6, the fetching of target instructions would continue however for the simplicity of this example only eight target instructions have been fetched. In cycle 6, the target instructions T1 and T2 are dispatched to the fixed point processing unit 20 during the execution of instruction X2. In cycle 7 instructions T3 and T4 are dispatched while instruction T1 is being decoded. Finally in cycle 8, instruction T1 is executed by the fixed point processing unit 20. Note that the branch in this case only causes a one cycle delay since there were two intermediate instructions between the compare and branch on condition instructions.

In FIG. 2i another example instruction sequence is illustrated that includes three intermediate instructions between the fixed point compare instruction and the conditional branch instruction. The timing diagram for the execution of this instruction sequence is illustrated in FIG. 2j. In FIG. 2j during cycle the first four instructions of this instruction sequence in FIG. 2i is illustrated. In cycle 2 the second four instructions are fetched while the first two instructions are dispatched. Note that since the first four instructions that were fetched did not contain the branch instruction, the scanning logic would not detect that there is a branch, until cycle 3. Therefore in cycle 3 if additional sequential instructions were available they would be fetched. Also in cycle 3 instructions X2 and X3 are dispatched to the fixed point processing unit 20 while the conditional branch is dispatched to the branch processing unit 14 while the fixed point processing unit decodes the compare instruction. In cycle 4, the target instructions T1 through T4 are now prefetched as a result of the scanning of the conditional branch instruction in cycle 3. Sequential instructions S1 and S2 are conditionally dispatched to the fixed point processing unit 20 while instruction X1 is decoded and the compare instruction is executed. At the completion of the execution of the compare instruction in the fixed point processing unit 20, the branch processing unit is signalled that the branch will be taken. In cycle 5 the next four target instructions are fetched (T5 through T8) while in the fixed point processing unit 20 instruction X2 is decoded and instruction X1 is executed. In cycle 6 the first of the two target instructions T1 and T2 are dispatched to the fixed point processing unit 20 while instruction X3 is decoded and instruction X2 is executed. In cycle 7 the next two target instructions T3 and T4 are dispatched while instruction T1 is decoded and instruction X3 is executed. In cycle 8 finally instruction T2 is being decoded while the first of the target instructions T1 is being executed. Note that the execution of this conditional branch results in a zero cycle delay since the number of intermediate instructions between the compare instruction and the branch is equal to three.

Figure 3:
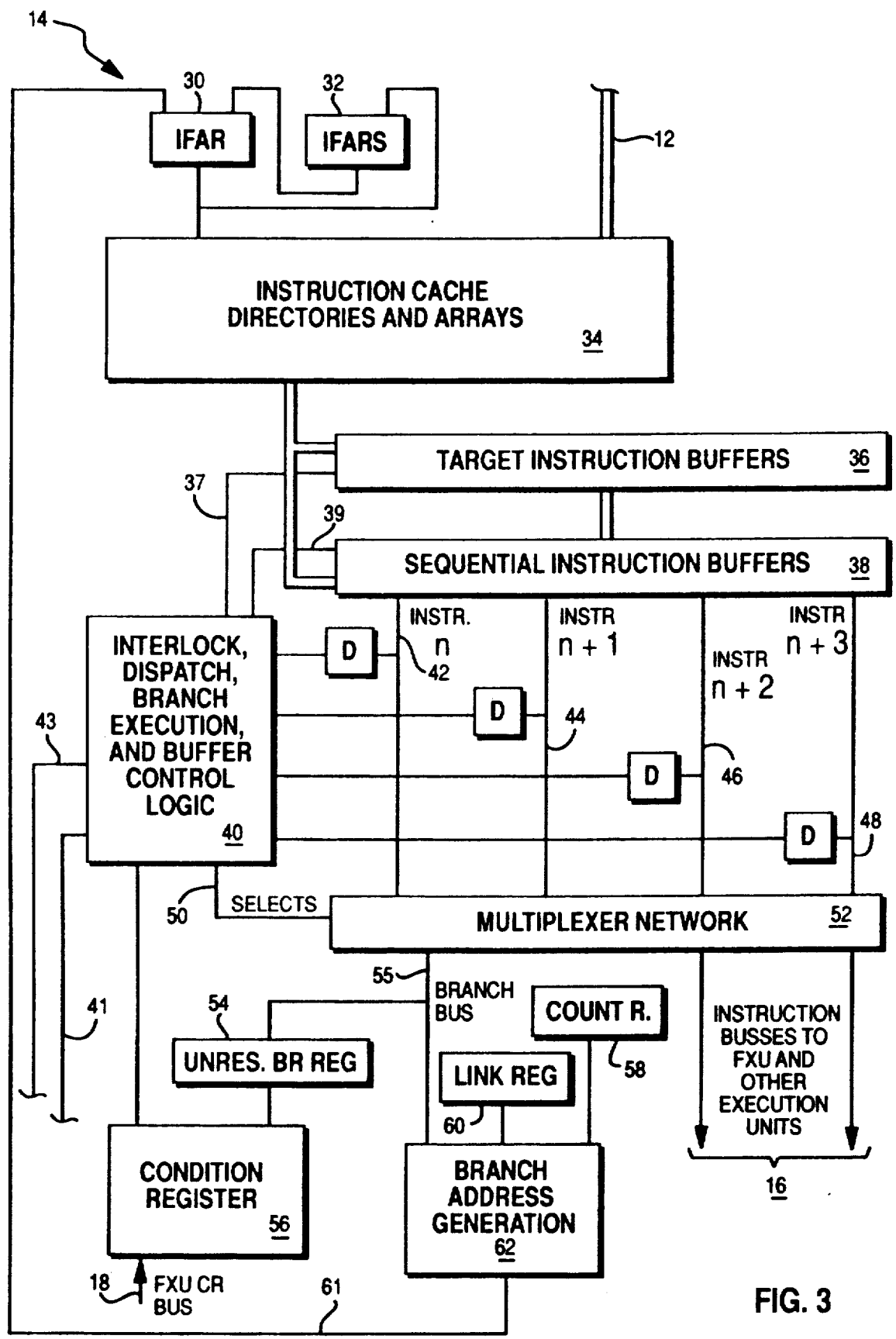
FIG. 3 is a block diagram illustrating the contents of the instruction fetching and branch processing unit.

FIG. 3 is a block diagram illustrating the instruction cache and branch processing unit 14. In FIG. 3 an instruction cache directory and array 34 is connected to bus 12 to receive instructions from memory. The instructions from the instruction cache 34 are provided to either a target instruction buffer 36 or sequential instruction buffer 38. Target instruction buffer 36 has a capacity of four in the preferred embodiment while the sequential instruction buffer 38 has a capacity of eight instructions. The target instructions in the target instruction buffer 36 pass to the sequential buffer 38 if the target instructions have been selected for dispatching. The interlock, dispatch, branch execution, and buffer control unit 40 is connected to the sequential instruction buffer 38 and scans the contents of the sequential instruction buffer 38 to detect branch instructions. Also, on line 50, the multiplex network 52 is controlled by the control logic 40 to dispatch two instructions over bus 16 to the fixed point processing unit 20.

Upon determining that a branch instructions exists in the sequential instruction buffer 38, the control logic 40 through the multiplexer network 52 provides the branch instruction to the unresolved branch register 54, if the branch is not resolved, and to the branch address generation unit 62. The branch address generation unit determines if the address of the target instruction of the branch can be computed. In certain instances the count register 58 or link register 60 are used in a computation of the address of the target instruction. The address of the target instruction is then provided over bus 61 to the instruction fetch address register 30. When the instruction fetch address register 30 has been loaded with an address of a target instruction the previous address of the sequential instructions being fetched is transferred to the instruction fetch address register shadow 32 to store the address of the sequential instructions if in fact the branch to the target instruction is not taken. The condition register 56 is connected by bus 18 to the fixed point processing unit 20 and determines the result of a condition compare instruction execution that determines whether a conditional branch is taken.

The control logic 40 monitors the condition register 56 and upon determining that a conditional branch is to be taken, the control logic 50 provides target instructions from the target instruction buffer 36 to the sequential instruction buffer 38 to be dispatched. The control of the target instruction buffer and the sequential instruction buffer is provided by lines 37 and 39 respectively. If the branch is not taken, the address of the sequential instruction are restored from register 32 to register 30 and sequential instructions in the sequential instruction buffer 38 continue to be dispatched. The control of the target instruction buffer 36 and the sequential instruction buffer 38 is provided by lines 37 and 39 respectively from the control logic 40. Additionally connected to control logic 40 is line 43 which provides the cancel conditional signal to the fixed point processing unit 20 indicating that the conditional instructions (the sequential instruction occurring after the branch instruction) are not to be executed. Line 41 provides the execute conditional signal to the fixed point processing unit 20 which indicates to the fixed point processing unit that these conditional instructions are to be executed.

Figure 4:
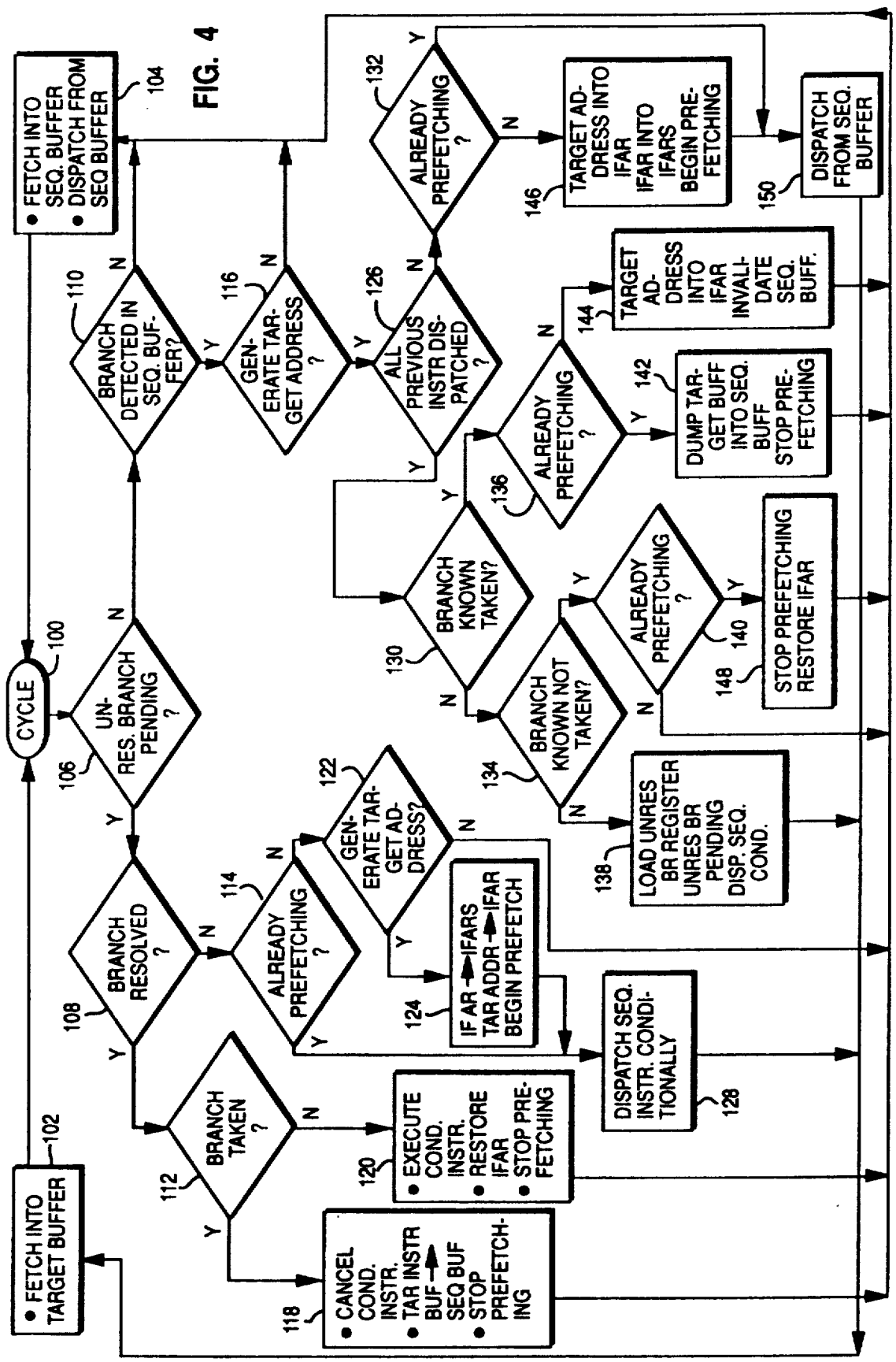
FIG. 4 is a flow diagram illustrating the operation of the interlock, dispatch, branch execution, and buffer control logic unit.
Figure 1:
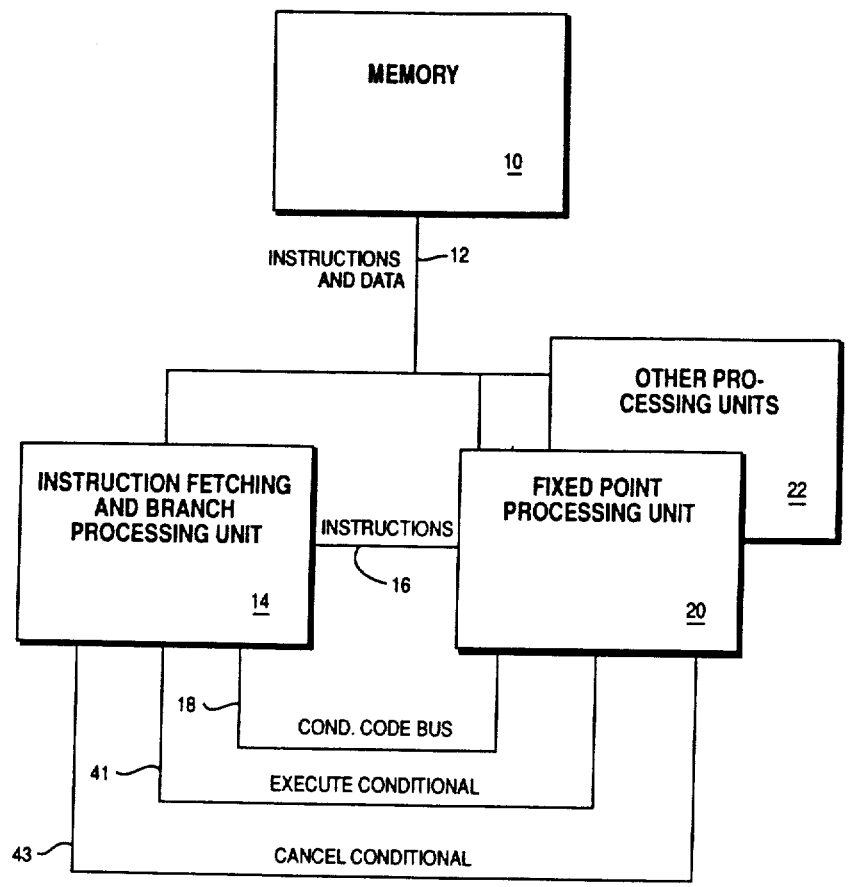

FIG. 4 is a flow chart representing the operation of the interlock, dispatch, branch execution and buffer control logic 40. In FIG. 4 at the start of a cycle 100 step 106 determines if an unresolved branch is pending. This is accomplished by determining if a unresolved branch pending bit has been set. If no unresolved branch is pending the flow proceeds to step 110 at which time the sequential instruction buffer 38 is scanned to determine if there are any branch instructions present. If not, the control flow proceeds to step 104 to fetch a new set of sequential instructions into the sequential instruction buffer 38 and to dispatch sequential instructions from sequential instruction buffer 38. Upon completing step 104 the control flow returns to step 100 to await the beginning of the next cycle. Returning to step 110, if a branch has been detected in the sequential instruction buffer 38 step 116 is executed in which a determination is made as to whether a target address can be generated. If not, the control flow proceeds to step 104. If so, the flow proceeds to step 126 to determine if all previous instructions have been dispatched. If all previous instructions before the branch have not been dispatched, the flow continues to step 132 to determine if prefetching of branch target instructions has begun. If not, in step 146 the target address is placed into the instruction fetch address register 30 and prefetching is begun. At this time the existing contents of the instruction fetch address register 30 is placed into the instruction fetch address register shadow 32. Upon completing step 146 or if prefetching has already begun the control flow proceeds to step 150 to dispatch instruction from the sequential instruction buffer 38. Control flow then proceeds to step 102 where branch target instructions are fetched into the target instruction buffer 36. Afterwards the flow returns to step 100 to await the beginning of the next cycle.

Returning to step 126 if all previous instructions before the branch have been dispatched, the flow proceeds to step 130 to determine if it is known at this point if the branch will be taken. If the branch is known to be taken the control flow proceeds to step 136 to determine if prefetching has begun. If not the control flow proceeds to step 144 to place the target address into the instruction fetch address register 30 and the current sequential buffer is invalidated. As before the original contents of register 30 is placed into register 32. The flow then proceeds to step 104. Returning to step 136 if prefetching has already begun the flow proceeds to step 142 to load the instructions from the target instruction buffer 36 into the sequential instruction buffer 38 and to stop prefetching. Again the flow proceeds to step 104. Returning to step 130 if it is not known whether or not the branch will be taken the flow proceeds to step 134 to determine if it is known whether or not the branch will not be taken. If the branch is not taken the flow continues to step 140 to determine if prefetching has begun. If not, the flow continues to step 104. However, if prefetching has begun, the flow proceeds to step 148 to stop the prefetching and restore the instruction fetch address register 30 with the contents of the instruction fetch address shadow 32. Upon completing step 148 the control flow proceeds to step 104. Returning to step 134. if it is not known if the branch will not be taken, the control flow proceeds to step 138 to load the unresolved branch register 54 and to set an internal bit indicating that there is an unresolved branch pending. Also, in sequential instructions are dispatched from the sequential buffer 38. These sequential instructions are for conditional execution, i.e., that they will be executed only if the branch is not taken. The control flow then proceeds to step 102.

Returning to step 106, if there is an unresolved branch pending the flow proceeds to step 108 to determine if the branch is resolved. In determining if the branch has been resolved, the control logic examines the contents of the condition register 56 to determine if the condition code has been set that is required for the resolution of the branch in the unresolved branch register 54. If the branch has not been resolved the flow proceeds to step 114 to determine if prefetching has begun. If not, the flow continues to step 122 to determine if the target address can be generated. If the target address cannot be generated the program flow proceeds to step 104. If the target address can be generated the program proceeds to step 124 to store the contents of the instruction fetch address register 30 into the instruction fetch address register shadow 32 and to place the generated target address into the instruction fetch address register 30 and to begin prefetching of branch target instructions. Proceeding to step 128 the dispatching of sequential instructions is begun. These sequential instructions are being dispatched for conditional execution, i.e., for execution upon the condition that the branch will not be taken. After step 128 the flow proceeds to step 102.

Returning to step 108, if the branch has been resolved the flow continues to step 112 to determine if the branch has been taken. If the branch has not been taken an execution conditional signal on line 41 (FIG. 1) will be provided to the fixed point processing unit 20. The instruction fetch address register 30 will be restored with the contents of the instruction fetch address register shadow 32 and prefetching will be halted. The control flow then proceeds to step 104. If the branch is taken a cancel conditional sequential instruction execution signal is provided on line 43 to the fixed point processing unit 20 and the branch target instructions in the target instruction buffer 36 are loaded into the sequential instruction buffer 38. Also prefetching is halted. Control flow then proceeds to step 104.

Although the invention has been described with reference to this specific embodiment, the description is not meant to be construed in a limiting sense. Various modifications of the disclosed embodiment as well as other embodiments of the invention, will become apparent to those persons skilled in the art upon reference to the description of this invention. It is, therefore, contemplated that the appended claims will cover any such modifications or embodiments that may fall within the true scope of the invention.

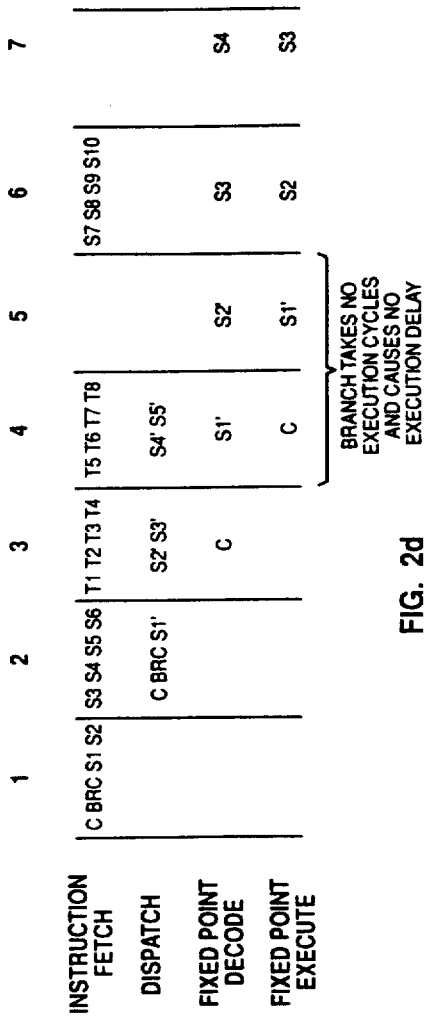

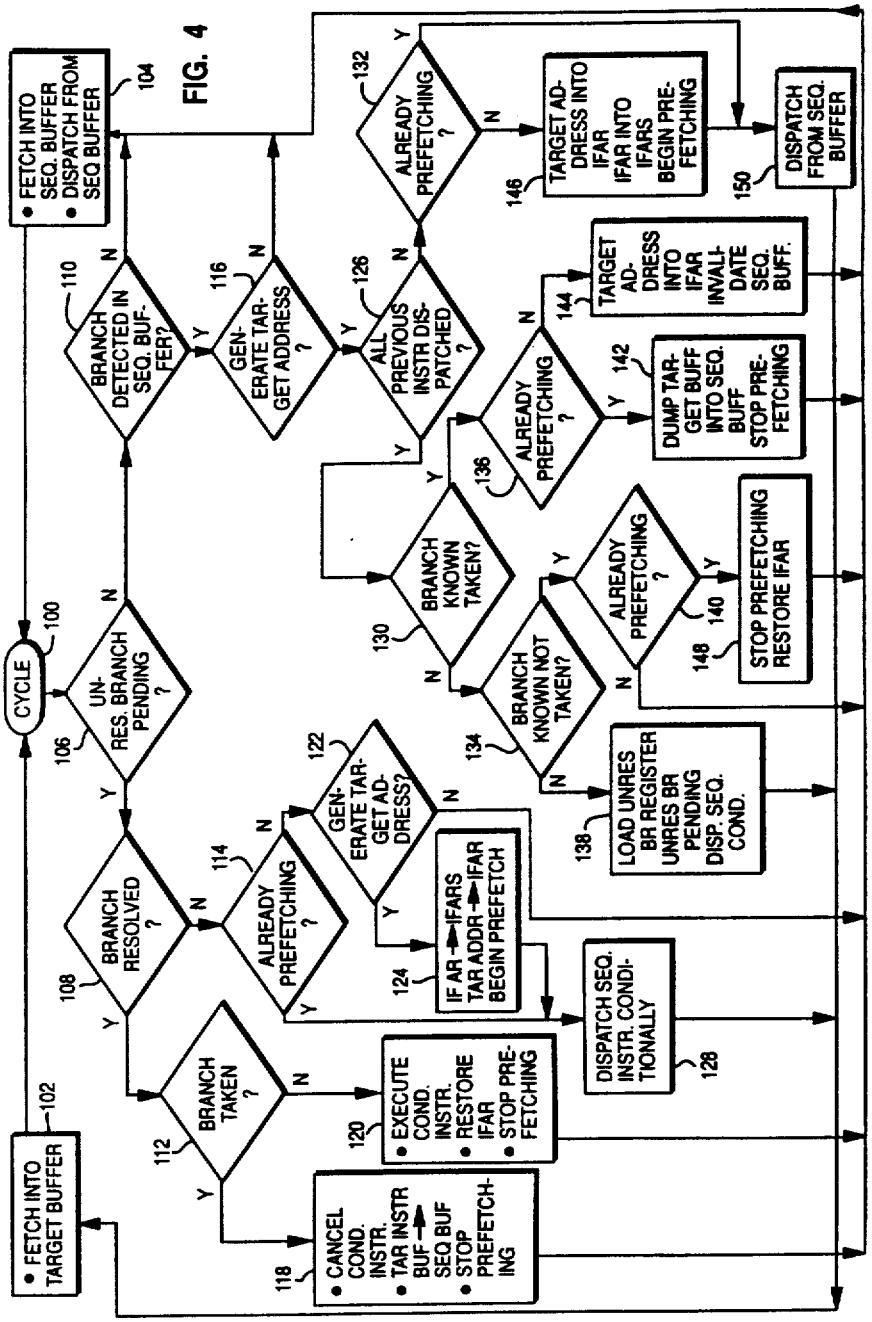

We claim:

1. A data processing system comprising:
    means for storing a sequence of instructions;
    means, connected to said storing means, for determining if said instruction sequence includes a branch instruction;
    means, connected to said storing means, responsive to said determining means for storing a sequence of branch target instructions in said storing means;
    means, connected to said storing means and said determining means, for dispatching instructions in said sequence to a first processor for execution and for dispatching instructions in said sequence after said branch instruction to said first processor to be executed on condition that said branch is not taken, said dispatching means further including a second processor means for determining if said branch is to be taken, during a cycle with the dispatching of said instructions after said branch instruction; and
    means, connected to said dispatching means, for directing, if said branch is not taken, said first processor to execute said instructions in sequence after said branch instruction or for dispatching, if said branch is taken, said branch target instructions to said first processor for execution.

2. A data processing system according to claim 1 wherein said means for storing a sequence of instructions includes means for fetching a plurality of instructions during a cycle.

3. A data processing system according to claim 2 wherein said dispatching means includes said means to dispatch a plurality of instructions during a cycle.

4. A data processing system according to claim 3 wherein said fetching means includes said means of storing said addresses of both a first instruction of said instructions in sequence after said branch instruction and a first instruction of said branch target instructions.

5. A data processing system according to claim 4 wherein said second processor means for executing said branch instruction includes means for determining a result of a previous instruction executed in said first processor.

6. A data processing system according to claim 5 wherein said storing means includes means for separately storing said branch target instructions from other instructions.

7. A data processing system comprising:
    means for fetching a plurality of instructions in sequence from a memory;
    a first buffer means, connected to said fetching means, for storing a portion of fetched instructions;
    means, connected to said first buffer means, for determining if a branch instruction is stored in said first buffer means;
    means, connected to said determining means, for fetching a sequence of branch target instructions in response to a branch instruction in said first buffer means;
    a second buffer means, connected to said fetching means, for storing a portion of said fetched branch target instructions;
    means, connected to said first buffer means, for dispatching sequential instructions located in sequence after said branch instruction form said first buffer means to a first processor for execution by said first processor on condition that a branch is not taken;
    a second processor, connected to said fetching means, for executing said branch instruction and determining if said branch is to be taken;
    means, connected to said second processor, for indicating to said first processor that said sequential instructions are to be executed if said branch is not taken;

means, connected to said second buffer means, for dispatching instructions from said second buffer means to said first processor if said branch is taken; and means, connected to said second processor, for indicating to said first processor that said sequential instructions are not to be executed if said branch is taken.

8. A data processing system according to claim 7 wherein said means for storing a sequence of instructions includes means for fetching a plurality of instructions during a cycle.

9. A data processing system according to claim 8 wherein said both dispatching means includes said means to dispatch a plurality of instructions during a cycle.

10. A data processing system according to claim 9 wherein said fetching means includes said means of storing said addresses of both a first instruction of said instructions in sequence after said branch instruction and a first instruction of said branch target instructions.

11. A data processing system according to claim 10 wherein said second processor includes means for determining a result of a previous instruction executed in said first processor.

12. A data processing system according to claim 11 wherein said storing means includes means for separately storing said branch target instructions from other instructions.

13. A data processing system according to claim 7 wherein said second processor includes means for storing a branch instruction dependent upon an unresolved condition, in a register until the unresolved condition is resolved and said means for dispatching instructions for execution on condition that a branch is not taken continues to dispatch said instructions until said condition is resolved.

14. A data processing system according to claim 13 wherein said second processor includes means for determining when said condition is resolved by determining when said first processor executing an instruction on which the branch instruction depends, stores a condition code to the means for executing said branch instruction and determining if said branch is to be taken.

15. A data processing system comprising:
means for storing a sequence of instructions;
means, connected to said storing means, for determining if said instruction sequence includes a conditional branch instruction dependent upon a result from a previous instruction in said sequence;
means, connected to said storing means, responsive to said determining means for storing a sequence of branch target instructions in said storing means;
means, connected to said storing means and said branch instruction including determining means, for dispatching instructions in said sequence to a first processor for execution and for dispatching instructions in said sequence after said branch instruction to said first processor to be executed on condition that said branch is not taken, said dispatching means further including a second processor for determining if said branch is to be taken, during cycle with the dispatching of said instructions after said branch instruction; and
means, connected to said dispatching means, for directing, if said branch is not taken, said first processor to execute said instructions in sequence after said branch instruction or for dispatching, if said branch is taken, said branch target instructions to said first processor for execution.

16. A data processing system according to claim 15 wherein said means for storing a sequence of instructions includes means for fetching a plurality of instructions during a cycle.

17. A data processing system according to claim 16 wherein said dispatching means includes said means to dispatch a plurality of instructions during a cycle.

18. A data processing system according to claim 17 wherein said fetching means includes said means of storing said addresses of both a first instruction of said instructions in sequence after said branch instruction and a first instruction of said branch target instructions.

19. A data processing system according to claim 18 wherein said first processor includes means for setting a condition register with said result of said previous instruction execution in said sequence and said second processor includes means for reading said condition register.

20. A data processing system according to claim 19 wherein said storing means includes means for separately storing said branch target instructions from other instructions.

21. A data processing system comprising:
means for storing a sequence of instructions;
means, connected to said storing means, for determining if said instruction sequence includes a branch instruction;
means, connected to said storing means, responsive to said determining means for storing a sequence of branch target instructions in said storing means while during a same cycle dispatching instructions in sequence to a first processor for execution and including means for dispatching instructions in sequence after said branch instruction to said first processor to be executed on condition that said branch is not taken during a cycle before a determination of whether said branch will be taken;
a second processor means, connected to said means responsive to said branch instruction including determining means, for determining if said branch is to be taken; and
means, connected to said second processor means, for directing, if said branch is not taken, said first processor to execute said instructions in sequence after said branch instruction or for dispatching, if said branch is taken, said branch target instructions to said first processor for execution.

22. A data processing system according to claim 21 wherein said means for storing a sequence of instructions includes means for fetching a plurality of instructions during a cycle.

23. A data processing system according to claim 22 wherein said dispatching means includes said means to dispatch a plurality of instructions during a cycle.

24. A data processing system according to claim 23 wherein said fetching means includes said means of storing said addresses of both a first instruction of said instructions in sequence after said branch instruction and a first instruction of said branch target instructions.

25. A data processing system according to claim 24 wherein said second processor means includes means for determining a result of a previous instruction executed in said first processor.

26. A data processing system according to claim 25 wherein said storing means includes means for separately storing said branch target instructions from other instructions.

27. A pipelined data processing system comprising:
means for fetching a sequence of instructions during a cycle;
means, connected to said fetching means, for determining if said instruction sequence includes a branch instruction and in response to a determination of a branch instruction, for storing a sequence of branch target instructions in said storing means;
means, connected to said fetching means, for dispatching a plurality of said fetched instructions in a cycle to a first processor for execution and for dispatching instructions in said sequence after said branch instruction to said first processor to be executed on condition that said branch is not taken, where said instructions are dispatched during a cycle before a determination of whether said branch will be taken;
a second processor for determining whether said branch will be taken;
means, connected to said dispatching means, for decoding said dispatched instructions in a cycle; and
means, connected to said decoding means and said second processor, for executing said decoded instructions in a cycle and including means for directing, if said branch is not taken, said first processor to execute said instructions in sequence after said branch instruction or for dispatching, fi said branch is taken, said branch target instructions to said first processor execution.

28. In a data processing system a method of processing comprising said steps of:
storing a sequence of instructions;
determining if said instruction sequence includes a branch instruction;
storing a sequence of branch target instruction if said sequence of instructions includes a branch instruction;
dispatching instructions in said sequence to a first processor for executing and dispatching instructions in said sequence after said branch instruction to said first processor to be executed on condition that said branch is not taken, where said instructions are dispatched during a cycle before a determination whether said branch will be taken in a second processor; and
directing, if said branch is not taken, said first processor to execute said instructions in sequence after said branch instruction or dispatching, if said branch is taken, said branch target instructions to said first processor for execution.

29. In a data processing system a method of processing comprising steps of:
fetching a plurality of instructions in a sequence from a memory;
storing a portion of fetched instructions;
determining if a branch instruction is stored;
fetching a sequence of branch target instructions in response to a branch instruction in said instruction sequence;
storing a portion of said fetched branch target instructions;
dispatching said first stored instructions to a first processor for execution by said first processor on condition that a branch is not taken;
executing said branch instruction in a second processor and determining if said branch is to be taken;
when said second processor determines that said branch is not taken, indicating by said second processor to said first processor that said dispatched first instructions are to be executed and executing said first stored instructions;
when said second processor determines that said branch is to be taken dispatching said branch target instructions to said first processor and executing said branch target instructions; and
indicating to said first processor that said conditional instructions are not to be executed if said branch is taken.

30. In a data processing system a method of processing comprising said steps of;
storing a sequence of instructions;
determining if said instruction sequence includes a conditional branch instruction dependent upon a result from a previous instruction in said sequence;
storing a sequence of branch target instructions in said storing means if a conditional branch instruction is in said instruction sequence;
dispatching instructions in said sequence to a first processor for execution and dispatching instructions in said sequence after said branch instruction to said first processor to be executed on condition that said branch is not taken, where said instructions are dispatched during a cycle before a determination of whether said branch will be taken by a second processor; and
directing, if said branch is not taken, said first processor to execute said instructions in sequence after said branch instruction or dispatching, if said branch is taken, said branch target instructions to said first processor for execution.

31. In a data processing system a method of processing comprising said steps of:
storing a sequence of instructions;
determining if said instruction sequence includes a branch instruction;
storing a sequence of branch target instructions if a branch instruction is in said instruction sequence while during a same cycle dispatching instructions in sequence to a first processor for execution and dispatching instructions in sequence after said branch instruction to said processor to be executed on condition that said branch is not taken during a cycle before a determination of whether said branch will be taken a said second processor;
determining if said branch is to be taken a said second processor; and
directing, fi said branch is not taken, said first processor to execute said instructions in sequence after said branch instruction or dispatching, if said branch is taken, said branch target instructions to said first processor for execution.

32. In a pipelined data processing system, a method of processing comprising the steps of;
fetching a sequence of instructions during a cycle;
determining if said instruction sequence includes a branch instruction and in response to a determination of a branch instruction, storing a sequence of branch target instructions;
dispatching a plurality of said fetched instructions in a cycle to a first processor for execution and dispatching instructions in said sequence after said branch instruction to said first processor to be executed on condition that said branch is not taken during a cycle before a determination of whether said branch will be taken by a second processor; decoding said dispatched instructions in a cycle; and executing said decoded instructions in a cycle and including a step of directing, if said branch is not taken, said first processor to execute said instructions or dispatching, if said branch is taken, said branch target instructions to said first processor for execution.

* * * * *

UNITED STATES PATENT AND TRADEMARK OFFICE
CERTIFICATE OF CORRECTION

PATENT NO. : 5,127,091

DATED : June 30, 1992

INVENTOR(S) : Edmond J. Boufarah, et al.

It is certified that error appears in the above-indentified patent and that said Letters Patent is hereby corrected as shown below:

The title page should be deleted to appear as per attached title page.

The sheets of drawings consisting of figures 1-4, shoud be deleted to appear as per attached pages.

Signed and Sealed this

Ninth Day of November, 1993

Attest:

BRUCE LEHMAN

Attesting Officer

Commissioner of Patents and Trademarks

United States Patent [19]
Boufarah et al.

[11] Patent Number: 5,127,091
[45] Date of Patent: Jun. 30, 1992

[54] SYSTEM FOR REDUCING DELAY IN INSTRUCTION EXECUTION BY EXECUTING BRANCH INSTRUCTIONS IN SEPARATE PROCESSOR WHILE DISPATCHING SUBSEQUENT INSTRUCTIONS TO PRIMARY PROCESSOR

[75] Inventors: Edmond J. Boufarah, Austin; Gregory F. Groboski, Cedar Park; Chien-Chyun Lee; Charles R. Moore, both of Ausin, all of Tex.

[73] Assignee: International Business Machines Corporation, Armonk, N.Y.

[21] Appl. No.: 297,784

[22] Filed: Jan. 13, 1989

[51] Int. Cl.⁵ .............................................. G06F 9/38
[52] U.S. Cl. ................................. 395/375; 364/230.6; 364/231.8; 364/261.5; 364/263; 364/263.1; 364/271.2; 364/931.5; 364/938.1; 364/938.2; 364/948; 364/948.3; 364/DIG. 1; 395/800
[58] Field of Search ... 364/200 MS File, 900 MS File; 395/375

[56] References Cited

U.S. PATENT DOCUMENTS

| | | |
|---|---|---|
| 3,699,526 | 10/1972 | Iskiyan et al. ............... 340/172.5 |
| 4,210,960 | 7/1980 | Borgeson et al. ............. 364/200 |
| 4,373,180 | 2/1983 | Linde ........................... 364/200 |
| 4,390,946 | 6/1983 | Lane ............................. 364/200 |
| 4,551,798 | 11/1985 | Horvath ....................... 364/200 |
| 4,679,141 | 7/1987 | Pomerene et al. ............ 364/200 |
| 4,742,451 | 5/1988 | Bruckert et al. ............. 364/200 |
| 4,742,453 | 5/1988 | Shibuya ........................ 364/200 |
| 4,777,594 | 10/1988 | Jones ............................ 364/200 |
| 4,791,557 | 12/1988 | Angel et al. .................. 364/200 |
| 4,853,840 | 8/1989 | Shibuya ........................ 364/200 |
| 4,853,889 | 8/1989 | Ditzel et al. .................. 364/900 |
| 4,912,635 | 3/1990 | Nishimukai et al. .......... 364/200 |
| 4,974,154 | 11/1990 | Matsuo ......................... 364/200 |
| 4,991,078 | 2/1991 | Wilheim et al. .............. 364/200 |
| 4,991,080 | 2/1991 | Emma et al. .................. 364/200 |
| 4,992,932 | 2/1991 | Ohshima ....................... 364/200 |

OTHER PUBLICATIONS

*IBM Technical Disclosure Bulletin*, vol. 29, No. 1, Jun., 1986, entitled "Branch-Processing Instruction Cache", pp. 357-359.

Primary Examiner—Thomas C. Lee
Assistant Examiner—Ken S. Kim
Attorney, Agent, or Firm—Thomas E. Tyson

[57] ABSTRACT

A data processing system including a circuit for storing a sequence of instructions, a circuit for determining if the instruction sequence includes a branch instruction, a circuit for storing a sequence of branch target instructions in response to the determination of the existence of a branch instruction in the stored sequence of instructions, a circuit for dispatching instructions in sequence after the branch instruction to a processor to be executed on condition that a branch is to be taken before a determination of whether said branch will be taken and simultaneously for determining if the branch is to be taken, any circuit for directing the processor to execute the instructions in sequence after the branch if the branch is not taken, or, if the branch is to be taken, for dispatching the branch target instruction sequence to the processor for execution.

32 Claims, 8 Drawing Sheets

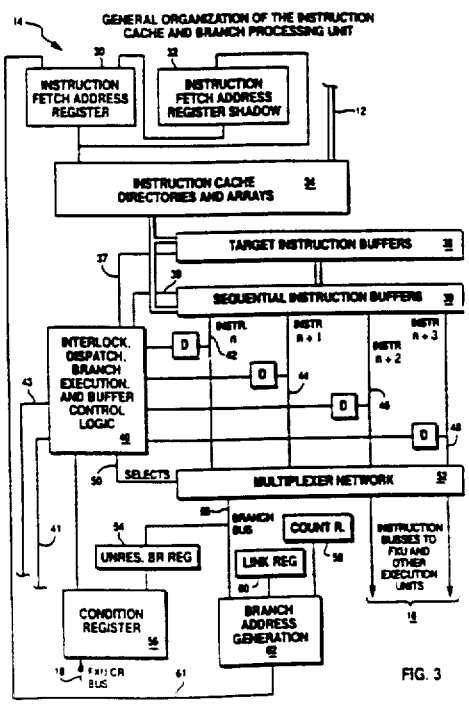

FIG. 3

PROCESSOR SYSTEM ORGANIZATION